Oct. 28, 1958 R. A. WHITLOCK, JR 2,857,929
MULTIPORT VALVE
Filed March 22, 1954 2 Sheets-Sheet 1
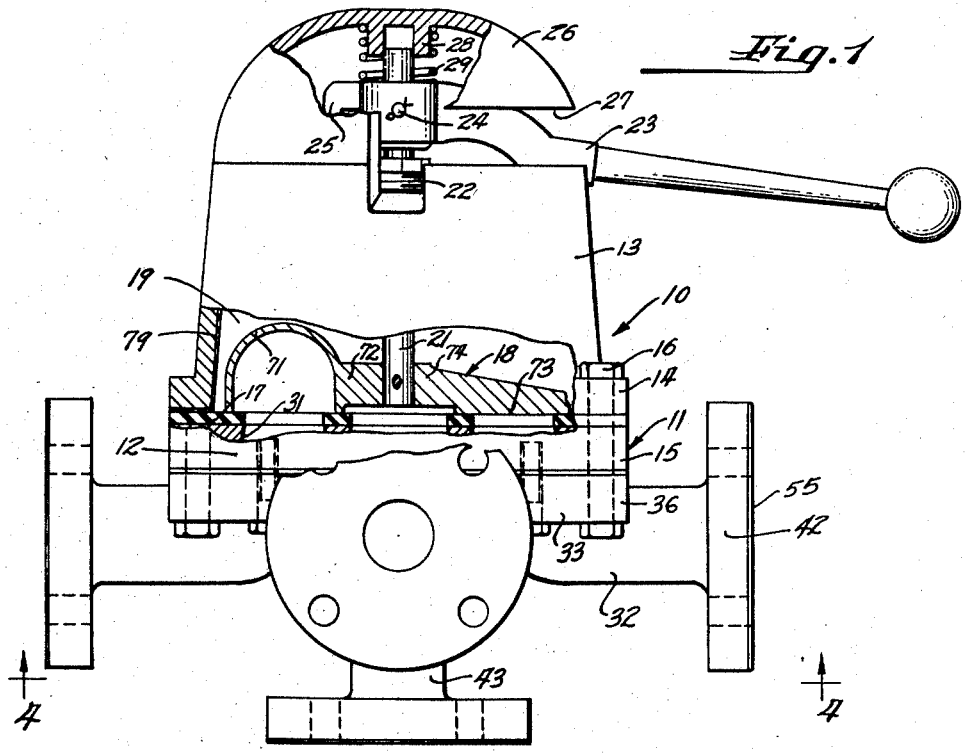
Fig.1
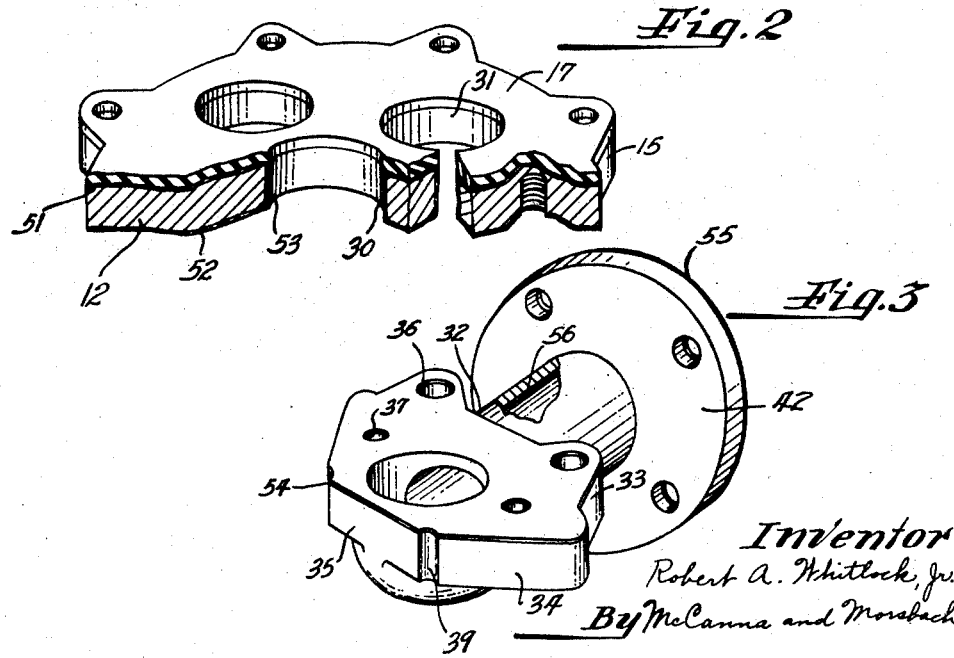
Fig.2
Fig.3
Inventor
Robert A. Whitlock, Jr.
By McCanna and Morsbach
Attys.

Oct. 28, 1958 — R. A. WHITLOCK, JR — 2,857,929
MULTIPORT VALVE
Filed March 22, 1954 — 2 Sheets-Sheet 2
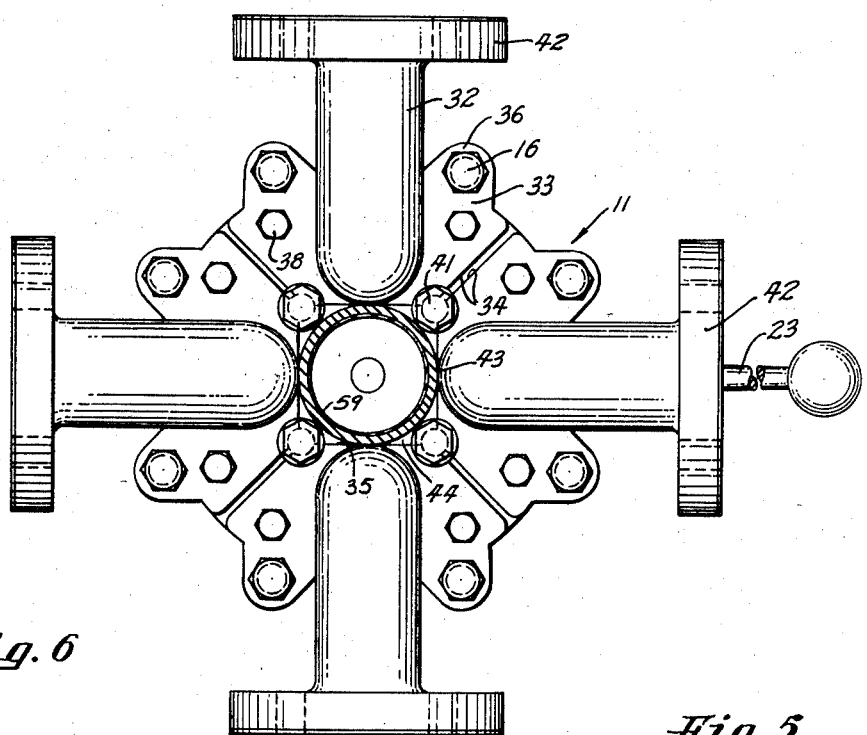
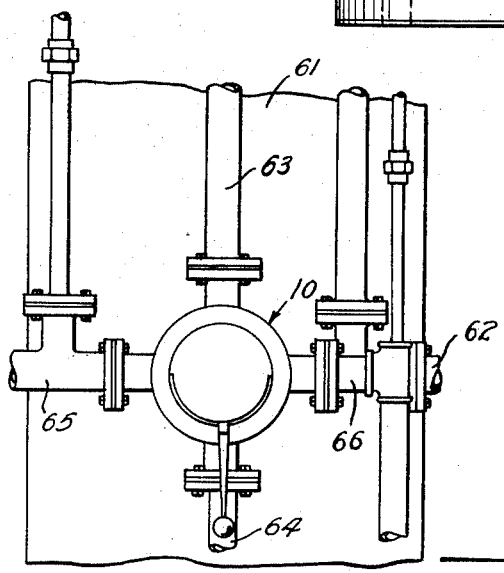
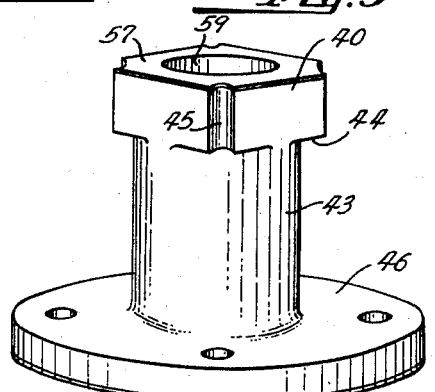
Inventor
Robert A. Whitlock, Jr.
By McCanna and Morsbach
Attys.

United States Patent Office 2,857,929
Patented Oct. 28, 1958

2,857,929

MULTIPORT VALVE

Robert A. Whitlock, Jr., Rockford, Ill., assignor to Aquamatic Inc., a corporation of Illinois Application March 22, 1954, Serial No. 417,679

4 Claims. (Cl. 137—625.29)

This invention relates to a multiport valve and more particularly pertains to a multiport valve of the rotary plate type.

In the formation of valves of the rotary plate type for controlling large flows of fluid, the valve must be many times larger than the flow conduits connected thereto to control the flows through the conduits without excessive restriction and because of the large size of such valves the reduction of the weight thereof becomes an important problem. A further problem, presented in the construction of such valves when the valves are used for controlling the flows of corrosive fluids or when for any other reason the internal surfaces of the valves are coated to prevent contact between the fluids flowing through the valve and the base metal of the valve body, is the matter of leakage through coating on the valve parts so that the fluids flowing through the valve contact the base metal of the valve. Even minute holes in the coating permit the corrosive fluid to contact the base metal of the valve at that point and cause rapid disintegration of the valve in that area necessitating replacement thereof.

An important object of this invention is to provide a multiport valve having an improved back plate construction which simplifies the forming and replacement thereof.

A further object of this invention is the provision of an improved multiport valve which is highly resistant to the corrosive action of the reagents flowing through the several ports and passages therein.

Another object of this invention is the provision of a multiport valve for use in handling corrosive fluids which is so constructed and shaped that the several parts subjected to the corrosive action of the fluid flowing therethrough may be more easily and efficiently lined with a protective cover.

Still another object of this invention is the provision of a multiport valve having a ported stator and a rotor, which valve has a plurality of separate identical chamber members attached to the stator plate to receive the flows therefrom and arranged so that the separate chamber members may be individually removed from the stator thereby facilitating replacement of the chamber members without disconnecting the entire valve and further minimizing the stock of replacement parts necessary to service the valve.

Yet another object of this invention is the provision of a multiport valve in which the shape of the various parts is simplified and the size thereof reduced thereby facilitating the construction of large valves for controlling the flows of large quantities of fluid and reducing the weight of such valves below that obtainable in the previous constructions.

These, together with various ancillary objects and advantages are attained by this device, a preferred embodiment of which is illustrated in the accompanying drawings wherein:

Figure 1 is a side elevational view of the valve, parts being broken away and shown in section to illustrate details of construction;

Fig. 2 is a fragmentary perspective view of the stator plate;

Fig. 3 is a perspective view of one of the chamber members;

Fig. 4 is a transverse sectional view through the valve taken on the plane 4—4 of Fig. 1;

Fig. 5 is a perspective view of the central chamber member; and

Fig. 6 is a fragmentary view of a water treating apparatus having the multiport valve of the present invention applied thereto.

The multiport valve 10 of the present invention is designed primarily for use in connection with water treating devices such as a deionizing apparatus. In a deionizing apparatus, the bed or beds of exchange material are regenerated by reagents which are highly corrosive in nature and for this reason, the tank, the piping and the valves associated therewith must either be formed of a non-corrodible material or suitably coated or lined so that the corrodible parts are not subjected to the reagents or the effluent from the tank during the regeneration. Further, the treated water from such an apparatus must be kept out of contact with the base metal of the valve to prevent the treated water from picking up ions of the base material which would thereby reduce its purity. Since the cost of non-corrodible base material for forming valves of such large size is high, the valves are formed of a relatively inexpensive base metal and lined with a coating of non-corrodible material.

The multiport valve 10 may vary considerably in structure within the scope of the invention. The structure selected to illustrate the invention (see Fig. 1) comprises a back plate assembly 11 including a ported face plate or stator 12 and a plurality of flow chambers which register with the ports in the face plate. A bonnet 13 is attached to the face plate adjacent its periphery and has annularly spaced ears 14 thereon coinciding with similar ears 15 spaced annularly on the face plate 12 and adapted for the reception of bolts 16 for holding the bonnet thereto. A disk-shaped gasket member 17 is interposed between the face plate and the bonnet to seal the latter thereto, the gasket extending across the face plate to provide a resilient seat for the rotor 18. The bonnet provides an inner chamber 19 above the ported portion of the face plate for the reception of the rotor 18 to be presently described more fully. The rotor is carried on a stem 21 which passes through a stuffing box 22 in the end of the bonnet and a lever 23 is pivotally attached to the stem beyond the end of the bonnet. For this purpose, the lever has an opening therein through which the stem extends loosely, the lever being attached to the stem by a pin 24 extending through the lever and the stem. One end 25 of the lever extends down into contact with the end of the bonnet while the other end of the lever extends outwardly for manual operation of the valve.

Attached to the top of the bonnet is a cap 26 which extends over the lever to conceal the larger portion thereof and substantially cover the upper end of the bonnet, the edge 27 of the cap being spaced from the upper edge of the bonnet through a part of the distance around the bonnet to provide space for moving the lever in indexing the rotor. The inner surface of the cap is provided with a boss 28 serving to guide the upper end of the stem and surrounding the boss is a coil spring 29 which acts between the cap and the lever to normally urge the stem downward to seat the rotor.

Whereas a manually operated mechanism for lifting, turning and reseating the rotor has been described, it is to be understood that other conventional apparatus may be utilized such as a motor driven or an hydraulically operated mechanism for lifting, turning and reseating the rotor. Since the specific operating mechanism forms no part of the present invention, a detailed description of the other conventional mechanisms for turning the rotor is deemed to be unnecessary.

The face plate or stator 12 is formed of a flat plate having a plurality of circumferentially spaced ports 31 therein and, as shown in the drawings, is also provided with a central port 30. A plurality of individual annularly spaced chamber members 32 are attached to one side of the face plate by means of a flange 33 on one end thereof, which flanges on each of the chamber members are preferably identically shaped in the form of truncated sectors. As best shown in Fig. 4, the side edges 34 of the flanges 33 extend radially of the face plate 12 and the inner edge 35 of each of the flanges 33 is spaced outwardly from the central port 30 in the face plate and define a central opening between the flanges. Spaced lugs 36 are provided on the flanges 33 and extend outwardly therefrom and coincide with the ears 15 on the face plate, the bolts 16 extending therethrough to secure the flanges to the face plate. The flange 33 is also formed with apertures 37 (Fig. 3) for the reception of studs 38, and arcuate recesses 39 are provided at the corners between the side edges 34 and the inner edge 35 to permit the passage of a stud 41 between adjacent flanges and into the face plate 15.

The chamber members 32 are angulated intermediate the ends to provide end portions which extend radially of the valve, and coupling flanges 42 are formed integrally with the outer end of the chamber members to permit connection thereof to the several fluid conduits leading to the water treating apparatus. Since the flow chambers extend outwardly from the valve it is apparent that connection of the several fluid conduits thereto is facilitated.

In addition to the several preferably identical annularly spaced chamber members 32, there is provided a central chamber member 43 (see Figs. 4 and 5) having a rectangular flange 44 on one end thereof adapted to be received within the opening defined by the inner edges 35 of the flanges on the annularly spaced chamber members. The corners of the flange 44 are provided with arcuate recesses 45 whereby the studs 41 which secure the flanges 33 to the face plate may extend therethrough with the heads of the studs overlying the adjacent corners of the rectangular flange 44 and the adjacent flanges 33 on the annularly spaced chamber members to also secure the central chamber member to the face plate. The central chamber member is provided with an attachment flange 46 on the other end thereof by means of which it is coupled to the conduits in the water treatment apparatus. As is apparent from Figs. 3 and 4, the inner edge 35 of each of the flanges 33 is substantially tangent to the side of the associated chamber member 32 at the inner end of the chamber member and the edges 40 of the flange 44 on the central chamber member 43 are substantially tangent to the sides of the central chamber member. This construction of the flanges 33 and 44 on the several chamber members and the manner of mounting the same on the face plate permits the body portions of the annularly spaced chamber members 32 to be positioned in closely spaced adjacency to the central chamber member 43 where the several chamber members are attached to the face plate so that the size of the face plate and consequently the size of the valve is determined only by the size of the ports in the face plate required to permit substantially unrestricted flow therethrough.

When the valve is used to handle corrosive fluids such as are encountered in the regeneration of a deionizing apparatus, the several parts of the valve are coated with a protective cover to prevent corrosion and to prevent the treated water from contacting the base metal. Since the face plate 12 is in the form of a flat plate, the opposed sides thereof may be easily covered with sheets 51 and 52 (Fig. 2) of non-corrodible material such as rubber which is affixed thereto and then vulcanized in position. Similarly, the central port 30 and the annularly spaced ports 31 may also be lined with flat strips of sheet rubber 53 which are vulcanized after applying to the face plate. The gasket member 17 which is interposed between the bonnet 13 and the face place is affixed to the coating on the upper surface of the face plate by a suitable adhesive so that curling thereof is prevented.

Because of the problems encountered due to the formation of minute holes in the coating, when coatings which are applied in a liquid state are utilized to cover the parts of the valve, the flow chambers 32 and 43 are formed with internal surfaces which are of simple configuration so as to permit covering of these surfaces with a sheet material such as rubber. As is apparent from the drawings, the body portions of the annularly spaced chamber members 32 are tubular and curved intermediate the ends thereof through an arc of substantial radius so that the inner surface of the body portion of the chamber members is of simple configuration. A sheet 54 (Fig. 3) of non-corrodible material is affixed to the face of the flange 34 on the chamber members 33 and a second sheet 55 to the face of the flange 42, the passage in the chamber member 32 being lined with a separate sheet 56 which is disposed therein and formed so as to extend around the neck of the curve. Similarly, the face of the flange 44 on the central chamber member (Fig. 5) is covered with a separate sheet of rubber 17 and the opposed flange 46 is covered with a sheet 58, the central passage being cylindrical in shape whereby covering thereof with a sheet 59 is facilitated. As in the covering of the stator plate, the sheet rubber is vulcanized after application to the several surfaces on the back plate assembly.

Thus the back plate assembly is formed of a plurality of separate parts of relatively small size and of simple configuration so that the latter may be easily formed and lined with non-corrodible sheet material, if desired. This greatly facilitates the construction of large multiport valves, and particularly those used in the handling of corrosive fluids. In addition, when the multiport valve is placed in service and connected to an apparatus such as the deionizing apparatus shown in Fig. 6, servicing of the valve by replacement of parts of the back plate is greatly facilitated.

The port arrangement of the face plate and the port and passage arrangement of the rotor 18 are primarily designed for use in controlling the flows of fluid to and from a deionizing apparatus. It is to be understood, however, that a larger number of ports may be provided in the face plate and the port and passage arrangement in the rotor modified to adapt the valve for use with other apparatus. Since the interchangeability of the several annularly spaced chamber members is highly advantageous, both in reducing the cost of production and in simplifying service, it is desirable to maintain a port arrangement in the face plate in which the several ports are uniformly spaced. As illustrated in the drawings, four annularly spaced ports are provided in the face plate and a corresponding number of annularly spaced chamber members 32 are affixed to the back of the face plate. The ports 31 in the face plate are thus spaced 90° apart. The rotor 18 (Fig. 1) includes an arcuate passage 71 which is arranged to communicate a pair of adjacent ports in the face plate with each other, the passage being connected to the hub of the rotor by a rib 72. The rotor is also provided with a closure plate 73 which is adapted to overlie one of the ports in the face plate when the rotor is in one of its rotational positions, which closure member is also connected to the hub of the rotor by a rib 74.

When the multiport valve is connected to the deionizing apparatus shown in Fig. 6, the untreated water from the supply conduit 62 is applied through the central chamber member 43 and flows through the uncovered port in the face plate. When the valve is in the service position shown in Figs. 1 and 6, the untreated water flows from the valve through the conduit 63 to the top of the tank 61 and then flows down through the bed of material contained therein. The treated water flowing out through the bottom of the tank passes through conduit 64 into the valve, through the arcuate passage 71 in the rotor and out the valve through the conduit 65. The other chamber member 32 is connected to drain through conduit 66. When regenerating the deionizing apparatus, it is merely necessary to manipulate the handle 23 to turn the rotor into its different rotational positions to thereby establish the various flows to and from the apparatus.

The rotor 18 which is of irregular shape may be most easily coated with a coating material which can be applied in a liquid state. One such material is a polyvinyl resin baked varnish such as that sold under the trade mark "Lithcote." The inner walls of the bonnet 13 are subjected to the corrosive action of any reagents flowing through the valve and the latter are also preferably coated as by affixing thereto a suitable sheet 79 of rubber or the like.

Each of the several parts of the back plate assembly are thus shaped so that lining of the portions thereof which contact the fluid flowing through the valve with non-corrodible sheet material is facilitated. Thus, the face plate has flat opposed sides and annular ports therein which may easily be covered with sheet material. Similarly, the chamber members have flat end flanges which may be efficiently lined and the passages through the body portions thereof are of simple configuration which may also be easily lined with sheet material.

The formation of the several chamber members separate from the back plate and from each other not only facilitates lining of the parts but also enables replacement of parts which become damaged after a period of service without disconnecting the entire valve from the apparatus associated therewith. A defective chamber member may obviously be replaced by merely removing that chamber member without disconnecting all of the other connections to the back plate assembly. Since the rotor is carried by the valve bonnet, it is apparent that if the bonnet is tilted relative to the face plate during assembly of the bonnet on the stator, as would be caused by uneven tightening of the bolts 16, the rotor would also be tilted relative to the face plate so that leakage may occur between the ports. In the present construction, only a small portion of the total number of fasteners which secure the bonnet to the face plate need be removed to permit removal and repair or replacement of a chamber member having a lining which has become defective. Consequently, the alignment of the bonnet on the face plate is undisturbed by the removal and replacement of one chamber member. In previous valves employing a back plate construction in which the face plate and the chamber members are formed integrally, all of the connections to the back plate had to be broken and because of the problem of accurately mounting the bonnet on the face plate to prevent tilting of the rotor, the back plate often could not be satisfactorily replaced in the field.

Since each of the annularly spaced chamber members are identically shaped, the stock of parts necessary for servicing the valve is minimized. It is also to be noted that the formation of the several chamber members separate from each other and from the face plate reduces the total quantity of material used in the formation of the back plate over that which is required when the face plate and chamber members are formed of a unitary cored casting. This formation of the several chamber members separate from the back plate has been effected in the present construction without any increase in overall size of the valve, the size of the valve being determined primarily by the size of the ports in the face plate necessary to provide substantially unrestricted flow through the valve.

I claim:

1. In a multiport valve structure including a back plate, a casing attached to the back plate and forming a fluid pressure chamber therewith, a rotor in said casing movable into different rotational positions to control the flows of fluid through the back plate, means for turning the rotor between the different rotational positions, said back plate comprising a flat face plate having a central port and a plurality of annularly spaced ports spaced equally apart, an elongated central chamber member extending axially of said central port and having a polygonal mounting flange attached to said face plate, a plurality of L-shaped chamber members each communicating at one end thereof with one of said annularly spaced passages and extending radially outward therefrom, mounting flanges on said one end of the L-shaped chamber members having the general shape of a truncated sector, said flanges extending contiguous to the flanges on said central chamber and to each other, and fasteners located at the juncture of a pair of flanges on the L-shaped chamber members with the flange on the central chamber member for securing said chamber members to said back plate.

2. The combination of claim 1 wherein said L-shaped chamber members extend contiguous to said central chamber member.

3. In a multiport valve structure including a back plate, a casing attached to said back plate and forming a fluid pressure chamber therewith, a rotor in said casing movable between different rotational positions to control the flow of fluid through the back plate, means for turning the rotor between different rotational positions, said back plate comprising a flat face plate having a central port and a plurality of annularly spaced ports, a sheet of corrosion resistant material affixed on opposite sides of the face plate and a strip of corrosion resistant material affixed to the walls of the ports in the face plate and sealed to the sheets on the opposite faces thereof, an elongated central chamber member extending axially from the central port and having a sheet of corrosion resistant material affixed to the inner walls thereof and forming a liner, a plurality of L-shaped chamber members having a sheet of corrosion resistant material affixed to the inner walls thereof forming a liner therein, said L-shaped members extending radially outwardly from the annularly spaced ports, a polygonal mounting flange on the central chamber member, a mounting flange on each of the L-shaped chamber members in the form of a truncated sector extending contiguous to the central chamber member and to each other, and a sheet of corrosion resistant material affixed to each of said mounting flanges and sealed to the liner in the respective chamber member.

4. The combination of claim 3 including a first set of fasteners located at the juncture of a pair of flanges on the L-shaped chamber members with the flange on the central chamber member for attaching said chamber members to the face plate, and a second set of fasteners extending through the flanges on the L-shaped chamber members, the face plate and the casing for attaching the casing and chamber members to the face plate.

References Cited in the file of this patent

UNITED STATES PATENTS

| 1,947,257 | Fritz | Feb. 13, 1934 |
| 2,437,144 | Wolf | Mar. 2, 1948 |
| 2,481,214 | Harper | Sept. 6, 1949 |
| 2,626,123 | Daniels | Jan. 20, 1953 |